United States Patent [19]

Hane

[11] Patent Number: 4,804,961
[45] Date of Patent: Feb. 14, 1989

[54] METHOD AND APPARATUS FOR MEASURING DISTANCES

[75] Inventor: Bengt Hane, Solna, Sweden

[73] Assignee: Stiftelsen Institutet for Mikrovagsteknik vid Tekniska Hogskolan i Stockholm, Stockholm, Sweden

[21] Appl. No.: 88,848
[22] PCT Filed: Dec. 11, 1986
[86] PCT No.: PCT/SE86/00568
  § 371 Date: Jul. 20, 1987
  § 102(e) Date: Jul. 20, 1987
[87] PCT Pub. No.: WO87/03698
  PCT Pub. Date: Jun. 18, 1987

[30] Foreign Application Priority Data

Dec. 12, 1985 [SE] Sweden .................. 8505888

[51] Int. Cl.$^4$ .......................... G01S 13/80; G01S 13/84
[52] U.S. Cl. .................................. 342/125; 342/42; 342/127
[58] Field of Search ............... 342/43, 112, 118, 125, 342/127, 129, 42

[56] References Cited

U.S. PATENT DOCUMENTS

| | | | |
|---|---|---|---|
| 2,907,999 | 10/1959 | Wadley | 343/12 R |
| 3,701,151 | 10/1972 | Sato et al. | 342/125 |
| 4,063,237 | 12/1977 | Nier et al. | 342/125 |
| 4,278,977 | 7/1981 | Nossen | 342/125 |
| 4,307,397 | 12/1981 | Holscher | 343/12 R |
| 4,315,260 | 2/1982 | Küpfer | 342/125 |
| 4,464,662 | 8/1984 | Tomasi | 342/125 |
| 4,577,150 | 3/1986 | Schreuder | 342/125 |
| 4,646,092 | 2/1987 | Schreuder | 342/125 |
| 4,677,441 | 6/1987 | Höfgen et al. | 342/125 |

FOREIGN PATENT DOCUMENTS

0096559 12/1983 European Pat. Off. .
2107380 8/1972 Fed. Rep. of Germany .

Primary Examiner—T. H. Tubbesing
Assistant Examiner—Mark Hellner
Attorney, Agent, or Firm—Nies, Webner, Kurz & Bergert

[57] ABSTRACT

A method for measuring the distance between a first object, which incorporates a transmitter-receiver unit, and a second object, which incorporates a transponder. In accordance with the invention there is transmitted from the transmitter-receiver unit (19) a first microwave signal (S1), which is received in the transponder (18). A second signal (S3) of much lower frequency $F_m$ is generated in the transponder and is modulated on a signal (S6) of microwave frequency in the transponder to form a modulated signal (S7). The modulated signal (S7) is transmitted from the transponder to the transmitter-receiver unit (19), where it is received and mixed down with the first signal (S1) and thereafter is (a) low-pass filtered to form a first measuring signal (S10) having the frequency $F_m$, the phase of which corresponds to the phase difference between the first microwave signal (S1) and the microwave signal (S8) received in the transmitter-receiver unit (19) and (b) demodulated, thereby to form a second measuring signal (S12) having the frequency $F_m$, the phase of which corresponds to the phase of the second signal (S3) generated in the transponder (18). The phases of the two measuring signals (S10, S12) are compared in a phase comparison circuit (27) to form a difference therebetween, this difference being proportional to the distance between the objects.

15 Claims, 2 Drawing Sheets

METHOD AND APPARATUS FOR MEASURING DISTANCES

The present invention relates to a method and to apparatus for measuring the distance between a transmitter-receiver unit and a transponder.

There are many instances where it is desirable to be able to determine with great accuracy the position of an object, e.g. a motor vehicle within a limited area, inter alia in order to be able to navigate the vehicle within said area. A common method of determining the position of an object in relation to a reference system is to measure the distance between the object and a number of reference points in the system. The position of the object can then be established quite readily from the distance values obtained, with the aid of trigonometrical functions. The accuracy to which the position of the vehicle is established is directly proportional to the accuracy at which the distances are determined. The present invention is particularly suited for measuring the distance between a transmitter-receiver unit, hereinafter called the master unit, and a transponder. In this respect the master unit may be located on a motor vehicle and a plurality of transponders placed at locations within the aforesaid area or around the demarcation lines thereof.

Two major distance measuring methods are known in the art. The first of these is based on the time taken for a pulse transmitted from the master unit to be reflected by the transponder and returned to the master unit, this method being the pulse radar method. The other of these two main methods is based on a phase comparison in the master unit between the signal transmitted to the transponder and the signal received therefrom, this method being the phase difference method.

The phase difference method is to be preferred in the case of limited ranges where a high degree of accuracy is required.

The present invention utilizes the phase difference method.

In accordance with the invention there is used in the simplest case a passive transponder. A passive transponder can only be used at short distances, since otherwise a master unit of high transmission power must be used.

For the purpose of increasing the range over which distances can be measured with the aid of limited transmitting powers, there is used a transponder which has its own transmitter oscillator. One known method of solving the problem concerning the phase relationship between transmitted and received signals is to phase-lock the transponder transmitter oscillator to the master unit oscillator, with the aid of a phase-locked loop. In order to avoid in the phase-locked loop feedback of the signal transmitted from the transponder, it is necessary to separate the transmission and reception of pulses in the transponder in time, so that they do not both occur at one and the same time. In order for a phase-locked loop to function satisfactorily, it is necessary to provide the transponder with a phase memory. Such a transponder is unavoidably highly complicated and very expensive. A system of this nature is also highly sensitive to disturbances.

In accordance with the invention there is provided a method for transferring information relating to the phase relationships in the transponder to the master unit, by means of a separate modulation process in which the signal transmitted by the transponder is separated from the signal transmitted by the master unit. This enables the master unit and the transponder to transmit and receive simultaneously therewith obviating the need for time division between transmission and receiving sequences in the system.

One particularly important advantage obtained with simultaneous transmission is that distances can be measured much more rapidly than is otherwise the case, which is highly beneficial under dynamic conditions, i.e. when the master unit is moving in relation to the transponder.

The aforementioned method according to the invention enables both active and passive transponders to be used for measuring distances by means of the phase difference method, instead of solely one reflector or of a complicated system with time division with regard to active transponders.

One highly placed desideratum in the present context is that of being able to observe or identify either one of a multiplicity of passive transponders or one of a multiplicity of active transmitting transponders. This desideratum is fulfilled by one embodiment of the method according to the invention in which the aforesaid modulation method is used.

Apparatus which incorporate a phase difference system that utilizes solely one single frequency has a limited maximum range over which unambiguous distances can be measured. This range decreases with higher frequencies. The accuracy with which distances can be measured, however, increases with increasing frequency. For the purpose of enabling unambiguous distances to be measured both over a long range and with a high degree of accuracy, phase difference measurements are carried out, in accordance with one embodiment of the invention, at a number of mutually different frequencies in successive order.

Further, important embodiments of the invention are described in the following description.

The present invention thus provides a method and apparatus for measuring distances that have none of the drawbacks or disadvantages of known systems and with which distances can be measured at extraordinary speeds.

Thus, the present invention relates to a method for measuring the distance between a first object and a second object, of which objects the first incorporates a transmitter-receiver unit and the second incorporates a transponder, in which method the transmitter-receiver unit transmits a signal to the transponder and receives a signal arriving from said transponder, these signals being of microwave frequency, and which method is characterized in that a first microwave signal is transmitted from the transmitter-receiver unit; that the signal is received in the transponder; that a second signal of much lower frequency $F_m$ is generated in the transponder; that this second signal is caused to be modulated in the transponder on a signal of microwave frequency; that the modulated signal is transmitted from the transponder to the transmitter-receiver unit where it is received and mixed down with the first signal and thereafter is a) passed through a low-pass filter, therewith producing a first measuring signal having the frequency $F_m$ the phase of which corresponds to the phase difference between the first microwave signal and the microwave signal received in the transmitter-receiver unit, and b) is demodulated, therewith to produce a second measuring signal having the frequency $F_m$ the phase of which corresponds to the phase of the second signal generated in the transponder; and in that the phases of the measuring signals are compared in a phase comparison circuit, therewith to establish a phase difference therebetween, this difference being proportional to the distance between said objects.

The invention also relates to apparatus for measuring the distance between a first object, incorporating a transmitter-receiver unit, and a second object, incorporating a transponder, in which apparatus the transmitter-receiver unit is constructed to transmit a signal to the transponder and to receive a signal transmitted therefrom, the improvement being characterized in that the transmitter-receiver unit includes a microwave oscillator, and a transmitting aerial and receiving aerial; that the transponder includes a receiving aerial and a transmitting aerial, the transponder being intended to receive a microwave signal transmitted from the transmitter-receiver unit; that the transponder incorporates signal generating means for generating a low frequency signal of much lower frequency $F_m$ than the frequency of the microwave signal; that a first modulator is provided for modulating said low frequency signal on a higher frequency modulated signal of microwave frequency in the transponder, which transponder is constructed to transmit this modulated signal to the transmitter-receiver unit, which unit is constructed to receive said modulated signal; that the transmitter-receiver unit includes a mixer for mixing down the received modulated signal with the frequency generated by the microwave oscillator; and in that the transmitter-receiver unit is constructed to divide a thus received modulated signal, partly via a low-pass filter so as to produce a measuring signal having the aforesaid frequency $F_m$, the phase of which corresponds to the phase difference between the phase of the microwave signal transmitted from the transmitter-receiver unit and the phase of the modulated signal received in said unit, and partly via a detector circuit for demodulating the modulated signal received by the transmitter-receiver unit, thereby to form a second measuring signal having the frequency $F_{m'}$, the phase of which corresponds to the phase of the low frequency signal of frequency $F_m$ generated in the transponder; and in that the transmitter-receiver unit incorporates a phase comparison circuit for comparing the phases of the aforesaid measuring signals, the difference between said phases being porportional to the distance between said objects.

The invention will now be described in more detail with reference to a number of embodiments thereof and with reference to the accompanying drawings, in which.

Figure 1:
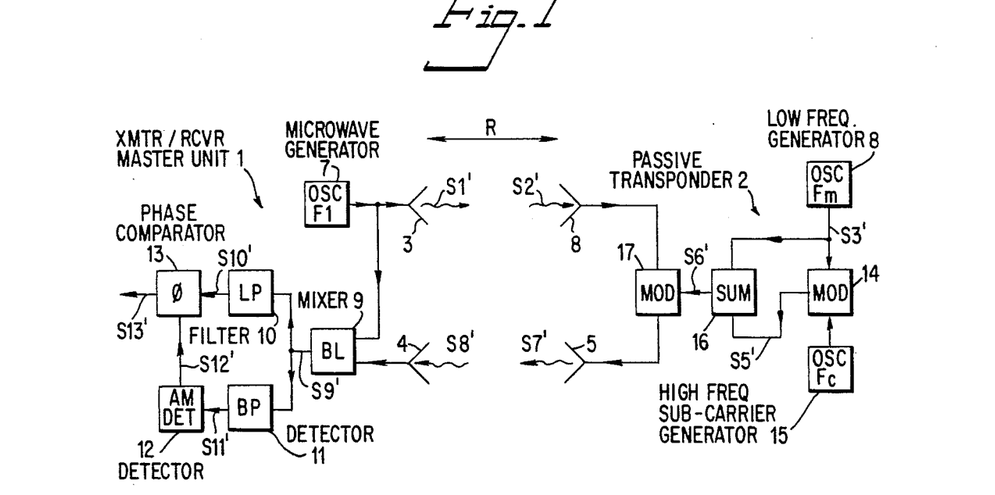
FIG. 1 is a block schematic of a master unit and a passive transponder.

FIG. 1 is a block schematic of a transmitter-receiver unit 1, hereinafter called the master unit, and a transponder 2, which is a so-called passive transponder. The master unit 1 has a transmission aerial or antenna 3 and a receiving aerial or antenna 4. The transponder 2, in turn, has a transmission aerial or antenna 5 and a receiving aerial or antenna 6. The aerials 3, 4 or antennae, of the master unit 1 are located at a distance R from the transponder aerials 5,6.

The master unit 1 includes a microwave oscillator 7 (OSC F1) which is constructed to generate a frequency F1 of 2450 MHz for example. The microwave signal S1' is transmitted from the master unit 1, by means of the aerial 3, and is received on the aerial 6 of the transponder 2, the received signal S2' being phase shifted relative to the signal S1'.

Figure 2:
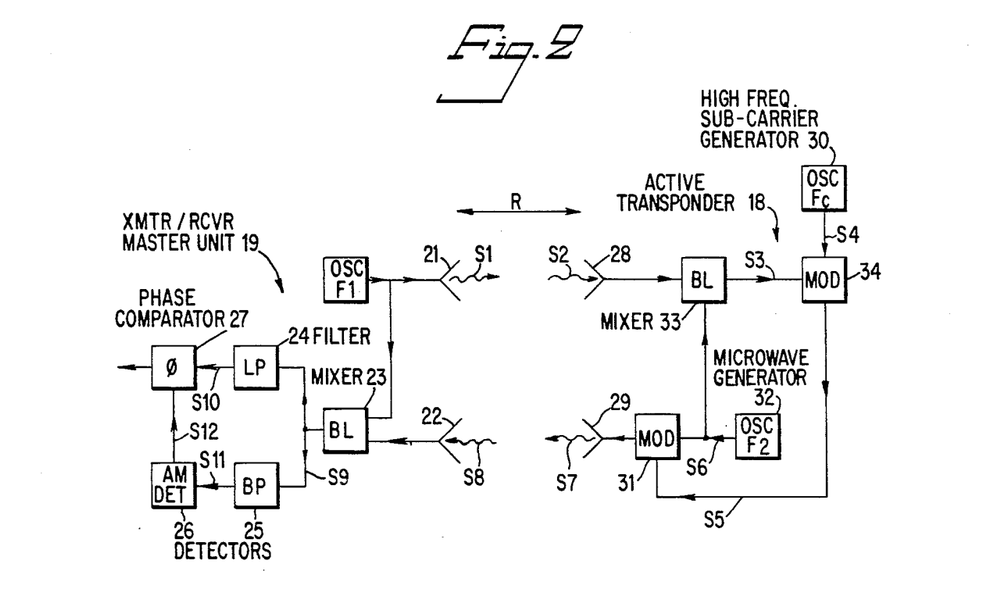
FIG. 2 is a block schematic of a master unit and an active transponder.

FIG. 2 is a block schematic similar to the block schematic of FIG. 1, but with the difference that the transponder is a so-called active transponder. The use of an active transponder is much more beneficial in those cases where the master unit and the transponder are spaced very far apart. The reason for this is, of course, because the master unit requires far lower transmission power when an active transponder is used than when using a passive transponder.

In accordance with the invention there is generated in the transponder 2; 18 a signal having a frequency $F_m$, this frequency being much lower than the frequency F1. The frequency $F_m$ may be in the region of from 10 to 100 kHz for example. In the case of a passive transponder 2, a signal S3' of frequency $F_m$ is generated in the transponder 2 by means of a separator oscillator 8 (OSC $F_m$).

In the case of an active transponder 18, the transponder is not provided with an osciallator for generating said signal of $F_m$-frequency. Instead, a signal of $F_m$-frequency is produced by mixing the microwave signal S2, transmitted from the master unit and received by the transponder, with the microwave signal S6 generated in the transponder. The signals are mixed in a mixer 33 (BL), to produce a signal S3 having the frequency $F_m$.

The signals S3'; S3 of $F_m$-frequency are caused to be modulated in a first modulator 17; 31 on a signal of microwave frequency, this modulated signal S7'; S7 being transmitted from the transponder 2;18 to the master unit 1;19, where the signal S8'; S8 is received. When the transponder used is a passive transponder, said signal of microwave frequency comprises the received microwave signal S2'.

Distinct from the passive transponder 2, the active transponder 18 incorporates a microwave generator 32 (OSC F2) which is constructed to produce a microwave signal having a frequency F2, which differs slightly from the frequency F1 generated in the master unit 19 and which is not locked to said frequency.

The signal S8'; S8 received in the master unit 1;19 is mixed down with the transmitted microwave signal of F1-frequency by means of a mixer 9;23, so as to obtain a signal S9';S9 having the frequency $F_m$, this signal being low-pass filtered in a low-pass filter 10; 24 (LP) and also demodulated by means of detector circuits 11,12; 25,26.

When passing the signal through the low-pass filter 10;24 (LP), there is obtained a first measuring signal S10';S10 the phase of which relative to the signal S3;S3' generated in the transponder corresponds to the phase of the signal S1;S1' transmitted from the master unit 1 in relation to the phase of the signal S8';S8 received in said master unit. Demodulation of the signal S9'in the detector circuit 11 results in a second measuring signal S11';S11, the phase of which corresponds to the phase of the signal S3';S3 generated in the transponder. These measuring signals S10';S10 and S12';S12 are passed to a phase comparison circuit 13;27 ($\phi$), in which the phase difference between the signals is produced. As will be seen from the formulae appended below, this phase difference is proportional to the distance R between the master unit and transponder.

The phase comparison circuit 27 produces a signal S13'; S13 which corresponds to the distance R between master unit 19 and transponder 18.

According to one embodiment of the invention, information relating to the phase position of the signal S3';S3 is transmitted, by modulating the amplitude of this signal on a subcarrier wave S4';S4 in a second modulator 14;34 (MOD). The subcarrier wave S4';S4 is generated with the aid of a separate oscillator 15;30 (OSC $F_c$). The frequency of the subcarrier wave S4';S4 is much lower than the frequency of the microwave signal S7';S7 transmitted by the transponder, but substantially higher than the frequency $F_m$ of the signal S3';S3. For example, the frequency of the subcarrier wave may be from ten to twenty times higher than $F_m$. The modulated subcarrier wave S5';S5 is thereafter modulated on the microwave signal S2';S6 by means of the first modulator 17;31, and the thus modulated signal S7';S7 is transmitted by the transponder 2;18. The aforesaid detection, or demodulation, is effected in the master unit 1;19 by means of said detector circuits, which incorporate a band-pass filter 11;25 (BP) and an amplitude detector 12;26.

Reference has been made in the aforegoing to amplitude modulation and amplitude detection. It will be understood, however, that other forms of modulation or detection can be effected instead, such as frequency modulation for example. It will also be understood that although the processes of modulation and detection are exemplified in the working examples with reference to amplitude modulation and amplitude detection that the invention is not restricted to this form of modulation and detection.

That which is achieved herewith is the transfer of the phase position of the signal S3';S3 in the transponder 2;18 to the master unit 1;19, where said phase position is compared with the phase position of the signal S10';S10, the phase position of which signal is dependent on the phase shift undergone by the microwave signal during its passage from and to the master unit via the transponder.

When the transponder is a passive transponder 2, information relating to the phase position of the signal S3' is transmitted to the master unit, in accordance with another preferred embodiment of the invention, by mixing the aforesaid modulated subcarrier wave S5' with the signal S3' of $F_m$-frequency in a mixer 16 (SUM), this mixed signal being caused to modulate the signal S2' received by the transponder, by means of the first modulator 17 (MOD).

When using an active transponder 18, there is also used a master unit 19 which corresponds to the aforedescribed master unit 1. Thus, the master unit 19 includes a microwave oscillator 20 (OSC F1), aerials or antennae 21,22, a mixer 23 (BL), a low-pass filter 24 (LP), a band-pass filter 25 (BP), an amplitude detector 26 (AM.DET), and a phase comparison circuit 27 ($\phi$). The receiver and transmitter aerials of the transponder 18 are respectively designated 28 and 29.

The aforedescribed method is described below mathematically, with the signals being identified in respective formulae by the same references as those used in FIGS. 1 and 2.

The method applied when using a passive transponder will be described first.

A signal S1 having the frequency F1 is transmitted from the master unit 1, namely $$S'_1 = e^{j\omega_1 t} \quad (1)$$

in which t is time and $\omega$ angular frequency.
The signal S'2 received by the transponders is $$S_2' = e^{j\omega_1(t-\frac{R}{c})} \quad (2)$$

in which R is the aforesaid distance and C is the speed of light.

The signal S'2 received by the transponders is in which R is the aforesaid distance and c is the speed of light.

The signal received by the transponder is modulated with two different signals. The one signal S'3 is a fundamental modulation signal $$S'_3 = e^{j\omega_m \cdot t} \quad (3)$$

The other modulation signal is created by modulating the signal S'3 with the signal S'4. This is effected in the modulator 14. S'4 functions as a ÷subcarrier wave.

$$S'_4 = e^{j\omega_c \cdot t} \quad (4)$$

The resultant signal S'5 obtains the appearance
$$S'_5 = e^{j\omega_c \cdot t} + e^{j(\omega_c + \omega_m)t} \quad (5)$$

The signals S'3 and S'5 are added together and the signal S'6 is permitted to modulate the incoming microwave signal S'2. This is effected in modulator 17. The outgoing signal S'7 can be expressed as $$S_{7}' = e^{j\omega_1(t-\frac{R}{c})} + e^{j[\omega_1(t-\frac{R}{c})+\omega_m \cdot t]} + e^{j[\omega_1(t-\frac{R}{c})+\omega_c \cdot t]} + e^{j[\omega_1(t-\frac{R}{c})+(\omega_c+\omega_m)\cdot t]} \quad (6)$$

The receiver part of the master-unit receives the signal $$S_{8}' = e^{j\omega_1(t-\frac{2 \cdot R}{c})} + e^{j[\omega_1(t-\frac{2R}{c})+\omega_m(t-\frac{R}{c})]} + e^{j[\omega_1(t-\frac{2R}{c})+\omega_c(t-\frac{R}{c})]} + e^{j[\omega_1(t-\frac{2R}{c})+(\omega_c+\omega_m)(t-\frac{R}{c})]} \quad (7)$$

The signal S'8 is mixed in the mixer 9 with part of the outgoing signal S'1, subsequent to which there is obtained $$S_9' = e^{-j\omega_1 \cdot \frac{2 \cdot R}{c}} + e^{j[\omega_m(t-\frac{R}{c})-\omega_1 \cdot \frac{2 \cdot R}{c}]} + e^{j[\omega_c(t-\frac{R}{c})-\omega_1 \cdot \frac{2 \cdot R}{c}]} + e^{j[(\omega_c+\omega_m)(t-\frac{R}{c})-\omega_1 \frac{2R}{c}]} \quad (8)$$

The frequency content of S'9 is the same as the frequency of S'6. S'9 is divided into two channels with the aid of two filters. Via low-pass filtration there is obtained $$S_{10}' = e^{j[\omega m(t-\frac{R}{c}) - \omega 1 \cdot \frac{2 \cdot R}{c}]} \quad (9)$$

The signal $S'_{10}$ has the same frequency as the signal $S'_3$ but has a phase-shift in relation to said signal. In order to be able to determine this phase difference, it is necessary to know the frequency and phase of the signal $S'_3$ in the master unit. To this end there is used, in accordance with a preferred embodiment of the invention, the arrangement in which the subcarrier wave $S'_4$ is used. Both of the modulators 14,17 are SSB-modulators (single sideband). This means that only one of the sidebands exists. The signal $S'_5$ contains information relating to the phase and frequency of the signal $S'_3$. The signal $S'_5$ is demodulated in the other of the two master unit channels. The following signal is obtained subsequent to band-pass filtration.

$$S_{11}' = e^{j[\omega c(t-\frac{R}{c}) - \omega 1 \cdot \frac{2R}{c}]} + e^{j(\omega c+\omega m)(t-\frac{R}{c}) - \omega 1 \frac{2R}{c}} \quad (10)$$

Subsequent to amplitude detection there is obtained $$S_{12}' = e^{j\omega m(t-\frac{R}{c})} \quad (11)$$

$S'_{10}$ and $S'_{12}$ are compared in the phase meter 13. The phase difference is $$S_{13}' = \frac{\omega_1 \cdot 2R}{c} = \phi_1 \quad (12)$$

As will be seen from the equation (12), the phase difference $\theta_1$ is proportional to the distance R. The distance R is resolved from the equation (12) with the aid of an arithmetical unit not shown in FIG. 1.

The function of a system which incorporates an active transponder can be described in a corresponding fashion, with the aid of the mathematical formulae given below.

A passive transponder functions solely as a reflector. This fact limits the system to an effective practical range in the order of some one hundred meters. An active transponder must be used, if this range is to be increased.

As beforementioned, in contrast to the aforedescribed passive transponder, the active transponder includes a microwave oscillator 32, which generates a frequency F2, which is slightly separated from the frequency F1.

The frequency differential F2-F1 corresponds to the frequency $F_m$ in the passive transponder.

Similar to the equation (2), the signal received by the transponder 18 has the relationship $$S_2 = e^{j\omega_1(t-R/c)} \quad (13)$$

Subsequent to being mixed with the microwave signal $$S_6 = e^{j\Omega_2 \cdot t} \quad (14)$$

generated in the transponder there is obtained $$S_3 = e^{j(\omega 2-\omega 1)t + \omega 1 \cdot \frac{R}{c}} \quad (15)$$

The signal $S_3$, the frequency of which is F2-F1, corresponds to the signal $S'_3$ in the case of the passive transponder. The signal $S_3$ is then modulated with the subcarrier wave $S_4$, which can be presented in the form of $$S_4 = e^{j\Omega_c \cdot t} \quad (16)$$

Modulation is effected with the modulator 34. The resultant signal $$S_5 = e^{j\omega c t} + e^{j[\omega c+\omega 2-\omega 1)t + \omega 1 \cdot \frac{R}{c}]} \quad (17)$$

is then applied to the modulator 31.

The signal $S_6$ is there modulated with the signal $S_5$. The signal $S_7$ leaving the transponder can be written thus:

$$S_7 = e^{j\omega 2 t} + e^{j(\omega 2+\omega c)t} + e^{j(\omega 2+\omega c+\omega 2-\omega 1)t + \omega 1 \cdot \frac{R}{c}} \quad (18)$$

The following relationship is obtained on the mater unit receiver $$S_8 = e^{j\omega 2(t-\frac{R}{c})} + e^{j(\omega 2+\omega c)(t-\frac{R}{c})} + e^{j[(\omega 2+\omega c+\omega 2-\omega 1)(t-\frac{R}{c}) + \omega 1 \frac{R}{c}]} \quad (19)$$

Subsequent to mixing in the mixer 23 there is obtained $$S_9 = e^{j[(\omega 2-\omega 1)t - \omega 2 \cdot \frac{R}{c}]} + e^{[(\omega c+\omega 2-\omega 1)\cdot t - (\omega 2+\omega c)\frac{R}{c}]} + e^{j[(2(\omega 2-\omega 1)+\omega c)t - (\omega 2+\omega c+\omega 2-\omega 1)\frac{R}{c} + \omega 1 \frac{R}{c}]} \quad (20)$$

Subsequent to low-pass filtration there is obtained $$S_{10} = e^{j[(\omega 2-\omega 1)t - \omega 2 \cdot \frac{R}{c}]} \quad (21)$$

and after band-pass filtration there is obtained $$S_{11} = e^{j[(\omega c+\omega 2-\omega 1)t - (\omega 2+\omega c)\frac{R}{c}]} + e^{j[(2(\omega 2-\omega 1)+\omega c)t - (\omega 2+\omega c+\omega 2-\omega 1)\frac{R}{c} + \omega 1 \frac{R}{c}]} \quad (22)$$

After AM-detection there is obtained $$S_{12} = e^{j(\omega 2-\omega 1)t - (\omega 2-\omega 1)\frac{R}{c} + \omega 1 \cdot \frac{R}{c}} \quad (23)$$

Finally, the following relationship is obtained, subsquent to comparing the signals $S_{10}$ and $S_{12}$, in a manner similar to that applied in the case of a passive transponder.

$$S_{13} = 2 \cdot \omega_1 \cdot \frac{R}{c} = \phi_1 \quad (24)$$

It is possible with the aid of an active transponder to achieve a range of several kilometers.

Thus, it is clear that when applying the present invention it is possible to utilize phase difference measuring techniques for distance measuring operations in which transmission and reception take place simultaneously in both master unit and transponder, which enables the measurements to be taken quickly. Furthermore, both the master unit and transponder are of relatively uncomplicated construction.

The aforedescribed method affords the very important advantage that the signal is labelled by the modulations, thereby to enable a signal transmitted from a transponder and received in the master unit to be distinguished from a signal which has been transmitted by the master unit and reflected by an extraneous object, in the surrounding countryside for example.

As will be seen from the above relationship (12) and (24), the distance measured is a function of the phase difference $\phi_1$. Since the phase difference $\phi_1$ can only be determined within the range of $0-2\pi$, the maximum unambiguous distance $R_{max}$ is $$R_{max} = \frac{c}{2 \cdot F1} \quad (25)$$

According to one preferred embodiment of the invention the aforesaid phase differences are measured at a plurality of successively transmitted microwave frequencies, the phase differences between the frequencies being determined in successive order.

Provided that two different, mutually sequential microwave frequencies are transmitted from the master unit, it is possible to obtain the maximum unambiguous distance from the relationship $$R_{max} = \frac{c}{2(F1 - F1')}$$

where F1 is one of the frequencies transmitted by the master unit and F1' is the other of said transmitted frequencies.

The degree of accuracy to which distances are measured increases with increasing frequency differentials. The range at which unambiguous distances can be determined, however, decreases with increasing difference in frequency. Consequently, in order to achieve both a high degree of accuracy and a wide measuring range, there are used in accordance with the invention more than two frequencies. For example, if the frequency differential F1-F1' is caused to be 50 kHz, 500 kHz, 5 MHz and 50 MHz respectively, the respective unambiguous distance ranges will be 3000 m, 300 m, 30 m and 3 m. This procedure thus eliminates any ambiguity.

In the case when an active transponder is used, the aforesaid frequency differential $F_m$ between the microwave signals F1 and F2 will be constant when F1 passes through a measuring series. This difference may be, for example, 10–100 kHz.

In accordance with an alternative method according to the invention microwave signals F1 are transmitted in succession from the master unit, in which F1 is caused to pass through, e.g., the series F1=2425.0, 2425.05, 2425.1 ... 2474.95, 2475 MHz, i.e. a series of equidistant frequencies within the frequency range 50 MHz, where the frequency differential is 50 kHz. This 50 kHz frequency differential thus provides an unambiguous measuring range of 0–3000 m.

In the described example, the measuring process is effected by transmitting 1000 different frequencies. If each measuring part-process takes 1 ms to complete, then the total measuring process will take 1000 ms to carry out. The inclination of a straight line expressing the phase differential $\phi$ as a function of the frequencies transmitted is determined by linear regression. The slope of the straight line is proportional to the distance.

This latter method affords a high degree of accuracy, due to the multiplicity of measurements made and because it enables a median value to be obtained.

Although the method first described is much faster than the latter method, it is not as accurate as said method.

In order to enable such measurements to be made when an active transponder is used, the master unit 19 and the transponder 18 are caused to shift synchronously between mutually different microwave frequencies F1, F2, in accordance with one preferred embodiment of the invention, by causing the master unit to transmit a synchronizing pulse, which is received by the transponder. The synchronizing pulse is intended to start a clock in both the master unit and the transponder, said clock being operative to cause the master unit and the transponder to generate pre-determined microwave frequencies F1, F2 simultaneously in successive order.

In accordance with one preferred embodiment, the frequency differential $F_m = F2 - F1$ is, in this case, made constant between the frequencies F1, F2 generated in successie order in the master unit and the transponder.

Figure 3:
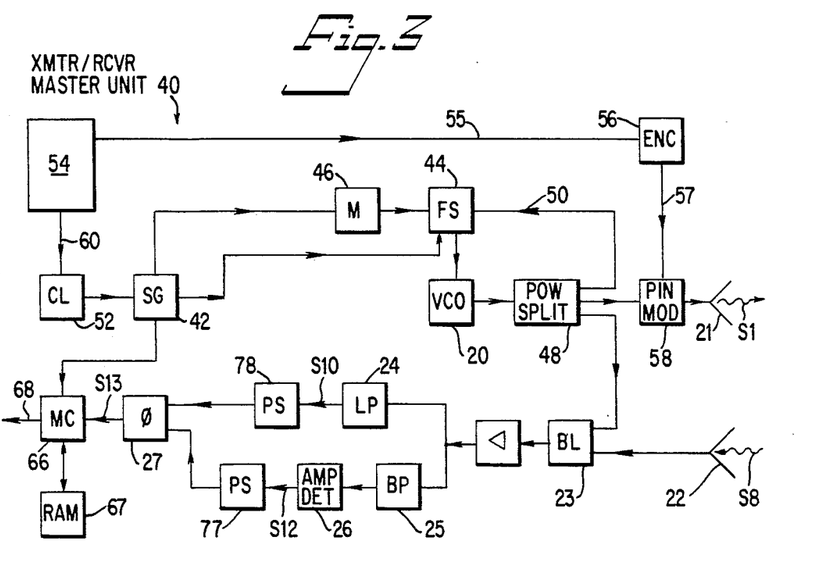
FIG. 3 is a block schematic of a master unit according to a further embodiment of the invention.
Figure 4:
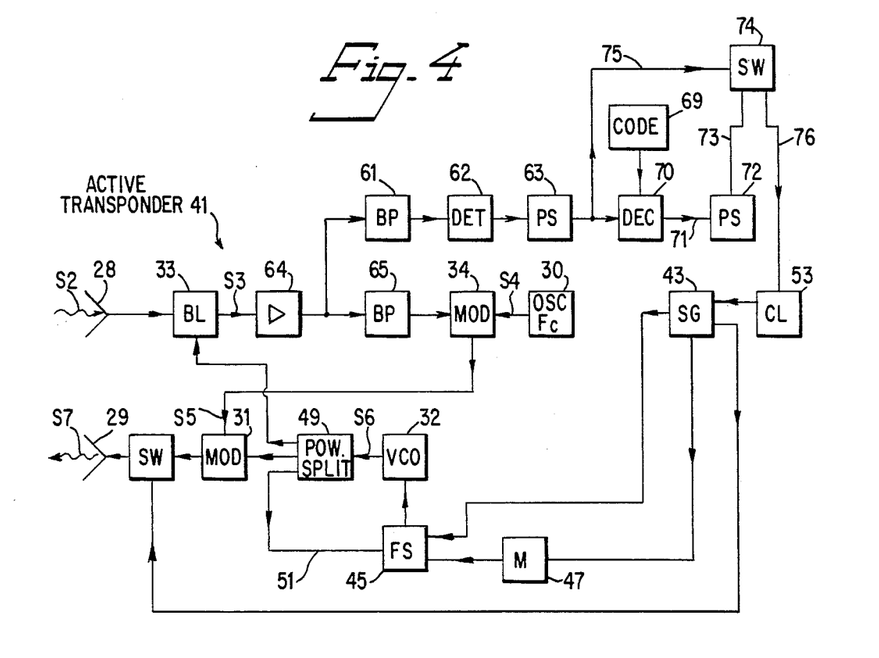
FIG. 4 is a block schematic of an active transponder according to a further embodiment of the invention.

FIGS. 3 and 4 are respective block schematics of a master unit 40 and a transponder 41, which correspond essentially with the units hereinbefore described with reference to FIGS. 1 and 2, but which are intended to carry out a measuring operation at a multiplicity of frequencies. The references used in the embodiments of FIGS. 1 and 2 are also used in FIGS. 3 and 4 to designate corresponding units.

According to one preferred embodiment of the invention both the master unit 40 and the transponder 41 incorporate a sequency generator 42; 43 for controlling a frequency synthesizer 44; 45 having an associated frequency memory store 46;47 in which a series of frequencies are stored. The frequency synthesizer may suitably be of a known kind and includes a crystal oscillator and divider circuits, and is intended to produce a voltage in a known manner, upon receipt of a signal from respective frequency stores and to apply said voltage to a voltagecontrolled oscillator 20;32 (VCO), so as to cause said oscillator to generate a frequency corresponding to the signal from the frequency store 44;45. Located downstream of respective oscillators 20; 32 is a power divider 48;49 which, among other things, is operative in sending the signal to respective frequency synthesizers 45;45 over conductor 50;51; where the signal is compared in a phase comparison circuit with the signal arriving from the aforesaid crystal oscillator and divider circuits. The phase comparison circuit is incorporated in the frequency synthesizer, in a known manner.

Each sequence generator has connected thereto a clock 52;53 which is intended to steer a respective generator in a manner to cause the generator to carry out a sequence of addresses to respective frequency synthesizers in successive order, thereby to generate a series of frequencies in succession. The clocks 52;53 are extremely accurate and will therefore steer the sequency generators simultaneously, provided that the clocks are started simultaneously.

The clocks 52;53 are constructed so that they will start and operate simultaneously, when activated by a synchronizing pulse. The synchronizing pulse is generated by a control unit 54 incorporated in the master unit 40. As described in the following, means are provided for transferring the synchronizing pulse to the clock 52 of the master unit and to the clock 53 of the transponder 41.

The control unit 54 steers an encoder 56, via a conductor 55, which codes an address in response to the signal arriving from the control unit, which coded address may be a binary code. The encoder 56 controls, via a conductor 57, a modulator, preferably a PIN-modulator 58, which is placed on the output 59 of the transmitter aerial 21 of the master unit. The PIN-modulator modulates the amplitude of the microwave signal generated by the microwave oscillator 20, so as to cause the transmission of a pulse train which corresponds to the binary code. The modulation frequencies of the PIN-modulator may be, for example, 40 kHz and 50 kHz respectively.

Thus, when a measuring sequence is to commence, the control unit 54 sends a signal to the encoder 56, which results in the transmission of a pulse train, via the transmitter aerial or antenna 21. The control unit 54 sends, at the same time, a signal to the master unit clock 52, via conductor 60, causing the clock to start. The transmitted pulse train is received in the transponder. The signal passes in the transponder through a band-pass filter 61, a detector circuit 62, in which the amplitude of the signal is demodulated, and a pulse former 63, whereafter the thus re-shaped pulse train is caused to start the transponder clock 53. In FIG. 4, the reference numeral 64 identifies an amplifier and the reference numeral 65 identifies a band-pass filter for band-pass filtration of the signal received and mixed down during a measuring sequence, before applying the signal to the abovementioned modulator 34, where the subcarrier wave $F_c$ is modulated.

It will be evident from this that the two clocks 52;53 are started and operate simultaneously. Consequently, a series of frequencies of the aforesaid kind is generated simultaneously in the master unit and in the transponder, a number of phase differences being measured in the phase meter 27 in conjunction therewith. These phase differences are fed to a microcomputer or processor 66 in the master unit, which stores the phase differences in a memory 67 and thereafter carries out the requisite computations, as described above, therewith to calculate the distance measured. The microcomputer 68 then sends a signal, via a conductor 68, to a display device, or a printer, or a control means for controlling an object in dependence on the distance measured, etc.

Each of the reference numerals 77 and 78 in FIG. 3 identifies a pulse former.

A problem arises when a plurality of transponders are used to measure a multiple of distances, in order to calculate therefrom, e.g., the position of an object with the aid of trigonometrical functions. This problem resides in the fact that it is desired to receive a reply from solely one transponder at a time.

Consequently, in accordance with another embodiment of the invention, each of the transponders is provided with its own individual code, stored in a memory store 69 in the transponder 41. Furthermore, a decoder 70 is provided for comparing a code received in the transponder with the code stored in the memory 69.

The individual code is transmitted from the master unit, where it is generated by means of the encoder 56 in accordance with a signal from the control unit 54, which corresponds to the individual code of a given transponder. The code is thus transmitted in the form of a pulse train, which is received by and processed in the transponder in the aforedescribed manner. When the received code is found to agree with the code stored in the memory 69, there is produced on the output 71 of the decoder 70 a pulse which is sent to a pulse former 72. The pulse former creates a pulse of given length, which is applied to the control input 73 of a switch 74, which therewith closes the conductors 75,76. There is generated in the master unit, and transmitted therefrom, a pulse train of which the first part incorporates the code individual for a given transponder and the latter part of which incorporates the aforesaid synchronizing pulse. As beforementioned, the pulse leaving the pulse former 72 in the transponder has a given length. This length corresponds to the length of the synchronizing pulse. The synchronizing pulse is thus passed from the detector 62 and the pulse former 63, via the conductor 75, the switch 74, and the conductor 76, to the clock 53, which is therewith started, during the period over which the switch receives a pulse from the transformer 72.

Consequently, it is possible with the aid of this embodiment, to call from the master unit a number of transponders in succession, each of which transponders will transmit solely after being called.

The transponders are preferably constructed so that the major parts of the current-consuming circuits of the transponders are switched-off during those periods in which respective sequency generators 43 receive no signal from the clock 53. When a sequency generator receives a signal from the clock, in response to a call from the master unit, the sequency generator activates a suitable, known means, such as a switch, so as to apply a voltage to the whole of the transponder. This arrangement will obviously save energy, and therewith greatly increase the useful life of batteries used to power the transponder.

It will be evident from the aforegoing that the invention enables distances to be measured extremely accurately in a relatively simple manner and in a very short period of time, which imparts, in particular, extremely good dynamic properties to the measuring system.

Furthermore, the invention enables a relatively wide band-width to be used, namely a band-width of several tens of megahertz, which in addition to enabling distances to be measured extremely accurately also results in the depression of disturbances, inter alia of the so-called multiple-path type.

It will also be apparent from the aforegoing, that the aforesaid disadvantages inherent with known systems are no longer found with the system according to the invention.

In the aforegoing the invention has been described with reference to various exemplifying embodiments thereof. It will be understood, however, that, inter alia, the aforedescribed circuits can be modified within the framework of the knowledge of those skilled in this art, without departing from the concept of the invention.

Consequently, the aforedescribed embodiments shall not be considered restrictive of the scope of the invention, since modifications can be made within the scope of the following claims.

I claim:

1. A method for measuring the distance between a first object, which incorporates a transmitter-receiver unit, and a second object, which incorporates a transponder, in which the transmitter-receiver unit transmits a signal to the transponder and receives a signal transmitted by the transponder, these signals being signals of microwave frequencies characterized by transmitting a first unmodulated microwave signal (S1';S1) from the transmitter-receiver unit (1;40); receiving said signal (S1';S1) in the transponder (2;18;41); generating in the transponder a second signal (S3';S3) of much lower frequency $F_m$; modulating said second signal (S3';S3) in the transponder on a signal (S2';S6) having a microwave frequency so that said modulated signal contains the phase of the unmodulated microwave signal received by the transponder; transmitting the modulated signal (S7';S7) from the transponder to the transmitter-receiver unit (1;29;40) in which said signal is received and mixed down with the first signal (S1';S1) and subsequently (a) low-passed filtered, to form a first measuring signal (s10';S10) having the frequency $F_m$, the phase of which corresponds to the phase difference between the first microwave signal (S1';S1) and the microwave signal received in the transmitter-receiver unit (1;19;40), and (b) demodulated, therewith to obtain a second measuring signal (S12';S12) having the frequency $F_m$, the phase of which corresponds to the phase of the second signal (S3';S3) generated in the transponder; and by comparing the phases of the measuring signals (S10';S12';S10;S12) in a phase comparison circuit (13;27), forming a phase difference therebetween, said difference between the measuring signals being due to the phase shift of the undemodulated microwave signal transmitted from the transmitter-receiver unit caused by its travel to the transponder and back again, and thereby being proportional to the distance between said two objects.

2. A method according to claim 1, characterized by modulating the second signal (S3';S3) on a subcarrier wave (S4'; S4) generated in the transponder (2; 41) by means of an oscillator (15; 30), said subcarrier wave having a significantly lower frequency than the microwave signal (S7'; S7) transmitted by the transponder but, at the same time, having a much higher frequency than the signal (S3'; S3) generated in the transponder and having the aforesaid frequency $F_m$; modulating the subcarrier wave on the microwave signal (S2'; S6) as beforementioned, whereafter the thus modulated signal (S7'; S7) is transmitted by the transponder (2; 18; 41) and received by the transmitter-receiver unit (1; 19; 40) where said demodulation is effected by passing the received and down-mixed signal (S9'; S9) through a bandpass filter and a detector means.

3. A method according to claim 1, when the transponder used is a passive transponder, characterized by generating the signal (S3') produced in the transponder (2) by means of an oscillator and modulating the signal when said subcarrier wave (S4'); and by adding the thus modulated signal (S5') to said generated signal (S3') having the frequency $F_m$, to produce a summation signal (S6') which is caused to modulate the microwave signal (S2') transmitted by the transmitter-receiver unit (1) and received by the transponder (2), the thus modulated signal (S7') being sent to the transmitter-receiver unit (1).

4. A method according to claim 1, when the transponder used is a so-called active transponder, characterized by generating in the transponder (18; 41) a microwave signal having the frequency F2 (S6) with the aid of an oscillator (32); mixing the microwave signal with the microwave signal (S2) of frequency F1 received by the transponder (18; 41), therewith forming the frequency differential F2-F1, which constitutes said generated signal (S3') having the frequency $F_m$; modulating the last mentioned signal (S3') with said subcarrier wave (S4) in a second modulator (34), therewith to produce a modulated signal (S5); and by modulating the microwave signal (S6) generated in the transponder (18; 41) with the aforesaid modulated signal (S5) in a first modulator (31), therewith to produce a further modulated signal (S7) which is sent to the transmitter-receiver unit (19; 40).

5. A method according to claim 1, characterized by transmitting a plurality of microwave frequencies in successive order, and determining the occurrent phase differences in the phase comparison circuit (13;17) in succession.

6. A method according to claim 5 when the transponder used is a so-called active transponder, characterized by shifting the transmitter-receiver unit and the transponder synchronously between mutually different microwave frequencies, by transmitting from the transmitter-receiver unit (40) a synchronizing pulse which is received by the transponder (41) and which is intended to start a clock (52; 53) in each of the transmitter-receiver unit and the transponder, said clocks (52;53) being constructed to cause said two units (40,41) to generate simultaneously a succession of pre-determined microwave frequencies.

7. A method according to claim 6, characterized in that the differential frequency F2-F1 between the respective pre-determined microwave frequencies generated in the transmitter-receiver unit (40) and in the transponder (41) is constant.

8. A method according to claim 1 when a multiple of transponders are located within a measuring area, characterized by providing each transponder (41) with an individual code, which is stored in said each transponder; transmitting from the transmitter-receiver unit (40) a coded signal prior to measuring the distance from a given transponder (41), this coded signal being received by all the transponders (41); and by activating that transponder (41) in which the code stored therein coincides with the transmitted code, so as to cause said transponder to transmit said microwave signal (57) to the transmitter-receiver unit (40).

9. Apparatus for measuring the distance between a first object, incorporating a transmitter-receiver unit, and a second object, incorporating a transponder, in which apparatus the transmitter-receiver unit is constructed to transmit a signal of microwave frequency to the transponder and to receive a signal of microwave frequency transmitted therefrom, characterized in that the transmitter-receiver unit (1;19;40) includes a microwave oscillator (7;20) and a transmitting aerial (3;21) and receiving aerial (4;22); that the transponder (2; 18;41) includes a receiving aerial (6;28) and a transmitting aerial (5;29), the transponder being intended to receive an unmodulated microwave signal (S1';S1) transmitted from the transmitter-receiver unit; that the transponder incorporates signal generating means (8;32;33) for generating a second signal (S3';S3) of much lower frequency $F_m$ than the frequency of the unmodulated microwave signal; that a first modulator (17;31) is provided in the transponder for modulating said second signal (S3';S3) on a signal (S2';S6) having a microwave frequency so that said modulated signal contains the phase of the unmodulated microwave signal received by the transponder, which transponder is constructed to transmit this modulated signal to the transmitter-receiver unit, which unit is constructed to receive said signal; that the transmitter-receiver unit includes a mixer (9;23) for mixing down the received signal (S8';S8) with the frequency generated by the microwave oscillator (7;20); and in that the transmitter-receiver unit is constructed to divide a thus received signal, partly via a low-pass filter (10;24) so as to produce a measuring signal (S10';S10) having the aforesaid frequency $F_m$ the phase of which corresponds to the phase difference between the phase of the signal (S1';S1) transmitted from the transmitter-receiver unit and the phase of the signal (S8';S8) received in said unit, and partly via a detector circuit (11,12;25,26) for demodulating the signal received by the transmitter-receiver unit, thereby to form a second measuring signal (S12';S12) having the frequency $F_m$, the phase of which corresponds to the phase of the signal (S3';S3) of frequency $F_m$ generated in the transponder (2;18;41); and in that the transmitter-receiver unit (1;19;40) incorporates a phase comparison circuit (13;27) for comparing the phases of the aforesaid measuring signals, the difference between the measuring signals being due to the phase shift of the unmodulated microwave signal transmitted from the transmitter-receiver unit caused by its travel to the transponder and back again, which is proportional to the distance (R) between said objects.

10. Apparatus according to claim 9, characterized in that the transponder (2; 18; 41) incorporates an oscillator (8; 30) for generating a subcarrier wave (S4'; S4) having a frequency which is much lower than the frequency of the microwave signal (S2'; S6) transmitted by the transponder, but which, at the same time, is substantially higher than the aforesaid frequency $F_m$; that the transponder includes a second modulator (14; 34) which in intended to modulate said generated signal of frequency $F_m$ on the subcarrier wave (S4'; S4); in that the first modulator (17; 31) is constructed to modulate the thus modulated subcarrier wave (S5'; S5) on the microwave signal (S2'; S6) present in the transponder, therewith to produce a signal (S7'; S7) which is passed to the transmitting aerial (5; 29) of the transponder; and in that the detector circuit incorporated in the transmitter-receiver unit (1; 19; 40) includes a bandpass filter (11; 25) and a detector (12; 26).

11. Apparatus according to claim 10 when the transponder used is a so-called passive transponder, characterized in that the transponder (2) incorporated an oscillator (8) for generating said signal (S3') having the frequency $F_m$; in that located between the second modulator (14) and the first modulator (17) is a third modulator (16) which is constructed to modulate the aforesaid modulated subcarrier wave (S4') arriving from said secondmodulator (14) with said signal (S3') having the frequency $F_m$; and in that the first modulator (17) is constructed to modulate the signal (S6') generated in the third modulator (16) with the microwave signal (S2'), which is therewith transmitted fromthe transponder (2).

12. Apparatus according to claim 10 when the transponder used is a so-called active transponder, characterized in that the transponder (18; 41) incorporates a microwave oscillator (32) for generating a microwave signal (S6), and a mixer (33) which is intended to form a signal (S3) with the differential frequency $F_m$ between the last mentioned microwave signal (S6) and the microwave signal (S2) received by the transponder (2), the signal thus formed constituting said signal (S3) having the frequency $F_m$; in that the second modulator (34) is constructed to modulate the last mentioned signal (S3) with said subcarrier wave (S4); in that said first modulator (31) is constructed to modulate the signal (S5) arriving from the second modulator (34) with the signal (S6) arriving from the microwave oscillator (32) of the transponder (18; 41), the resultant modulated signal being transmitted by means of the transmitting aerial (29) of the transponder (18; 41).

13. Apparatus according to claim 12, characterized in that both the transmitter-receiver unit (40) and the transponder (41) incorporate a sequence generator (42; 43) for controlling a frequency synthesizer (44; 45) with an associated frequency memory (46; 47) having stored therein a pre-determined series of frequencies of microwave frequency, said frequency synthesizers (44;45) being intended to steer the microwave oscillator (20;32) of respective units (40;41) such as to cause said oscillator to generate said series of frequencies; in that said sequence generator (42;43) is connected to a clock (52;53) which is intended to steer said sequence generator (42;43) in a manner to cause the generator to pass through a sequence in which said series of frequencies are generated in a successive order; in that said clocks (52;53) are constructed to be activated and to operate simultaneously with one another upon receipt of a respective synchronizing pulse; and in that the transmitter-receiver unit (40) incorporates a control unit (54) which is constructed to generate said synchronizing pulse; and in that means (60; 56–50; 61–63, 74–76) are provided for transmitting the synchronizing pulse to the clock (52) of the transmitter-receiver unit (40) and to the clock (53) of the transponder (41).

14. Apparatus according to claim 13, characterized in that the transmitter-receiver unit (40) is provided with a modulator (58) located between the microwave oscillator (20) and the transmitter aerial (21) of said unit, said modulator (58) being steered by the control unit (54) in a manner to modulate a pulse train on the microwave signal (S6) to be transmitted; and in that the transponder (41) incorporates a detector circuit (61–63) for demodulating said pulse train.

15. Apparatus according to claim 14, characterized in that when a multiple of transponders (41) are used, each of the transponders is provided with an individual code stored in a memory (69); in that a decoder (70) is provided for comparing the code stored in the memory (69) with a code transmitted from the transmitter-receiver unit (40) in the form of a pulse train, which is demodulated by means of said detector circuit; and in that the decoder (70) is intended to activate the transponder (41) for frequencies and transmitting said series of frequencies, when agreement is found between said compared codes.

* * * * *

UNITED STATES PATENT AND TRADEMARK OFFICE
CERTIFICATE OF CORRECTION

PATENT NO. : 4,804,961
DATED : February 14, 1989
INVENTOR(S) : BENGT HANE

It is certified that error appears in the above-identified patent and that said Letters Patent is hereby corrected as shown below:

IN THE SPECIFICATION:

Column 4, line 26, "osciallator" should be corrected to read --oscillator--.

Column 6, lines 13, 14 and 15 cancel "in which R is the aforesaid distance and C is the speed of light.

The signal $S'_2$ received by the transponders is".

Column 10, line 29, change "successie" to --successive--.

Column 11, line 55, change "numberals" to --numerals--.

Column 13, line 18, change "(1;29;40)" should read -- (1; 19; 40) --.

(Claim 1) Column 13, line 21, change "(s10';S10)" to --(S10';S10)--.

(Claim 3) Column 13, line 58, "when" should be changed to --with--.

(Claim 6) Column 14, lines 24 and 25, "transmitterreceiver" should read --transmitter-receiver--.

UNITED STATES PATENT AND TRADEMARK OFFICE
CERTIFICATE OF CORRECTION

PATENT NO. : 4,804,961

DATED : February 14, 1989

INVENTOR(S) : BENGT HANE

Page 2 of 2

It is certified that error appears in the above-identified patent and that said Letters Patent is hereby corrected as shown below:

(Claim 11) Column 15, line 53, change "incorporated" to --incorporates--.

Column 15, line 59, change "secondmodulator" to --second modulator--.

Column 15, line 63, change "fromthe" to --from the--.

Signed and Sealed this

Twenty-fourth Day of October, 1989

Attest:

DONALD J. QUIGG

Attesting Officer

Commissioner of Patents and Trademarks